(12) United States Patent
Chauhan et al.

(10) Patent No.: US 11,560,519 B2
(45) Date of Patent: Jan. 24, 2023

(54) TRANSFER HYDROGENATION OF HEAVY HYDROCARBONS WITH HYDROGEN-DONOR SOLVENTS

(71) Applicant: Battelle Memorial Institute, Columbus, OH (US)

(72) Inventors: Satya P. Chauhan, Columbus, OH (US); Daniel B. Garbark, Blacklick, OH (US)

(73) Assignee: Battelle Memorial Institute, Columbus, OH (US)

(*) Notice: Subject to any disclaimer, the term of this patent is extended or adjusted under 35 U.S.C. 154(b) by 0 days.

(21) Appl. No.: 17/654,076

(22) Filed: Mar. 9, 2022

(65) Prior Publication Data

US 2022/0195307 A1   Jun. 23, 2022

Related U.S. Application Data

(62) Division of application No. 16/631,106, filed as application No. PCT/US2018/042106 on Jul. 13, 2018, now Pat. No. 11,306,256.

(Continued)

(51) Int. Cl.
*C10G 45/32* (2006.01)
*C10G 45/44* (2006.01)
(Continued)

(52) U.S. Cl.
CPC ............. *C10G 1/065* (2013.01); *C10G 1/002* (2013.01); *C10G 1/02* (2013.01); *C10G 1/042* (2013.01);
(Continued)

(58) Field of Classification Search
None
See application file for complete search history.

(56) References Cited

U.S. PATENT DOCUMENTS 3,993,698 A * 11/1976 Kirby .................... C07C 43/164
                                                             504/351
4,303,496 A   12/1981 Rudnick
                       (Continued)

FOREIGN PATENT DOCUMENTS

CN    102344823 A    2/2012
CN    104232158 A    12/2014
              (Continued)

OTHER PUBLICATIONS

Written Opinion from PCT Application No. PCT/US2018/042103, dated Dec. 17, 2018.
(Continued)

*Primary Examiner* — Tam M Nguyen
(74) *Attorney, Agent, or Firm* — Greer, Burns & Crain, Ltd.

(57) ABSTRACT

Processes for converting the coal-derived heavy-oil fraction of syncrude to polyols are described. The processes involve mixing a feed stream comprising the coal-derived heavy-oil fraction with an alcohol and aqueous sulfuric acid, heating the mixture, reacting the coal-derived heavy-oil fraction with ozone, and reacting the ozonated heavy-oil fraction with glycerin to form the polyol. In some cases, the ozonated heavy-oil fraction can be neutralized before reacting the ozonated heavy-oil fraction with the glycerin.

17 Claims, 4 Drawing Sheets

Related U.S. Application Data

(60) Provisional application No. 62/642,709, filed on Mar. 14, 2018, provisional application No. 62/532,801, filed on Jul. 14, 2017.

(51) Int. Cl.
*C10G 1/06* (2006.01)
*C10G 1/02* (2006.01)
*C10G 69/06* (2006.01)
*C10G 1/00* (2006.01)
*C10G 1/04* (2006.01)

(52) U.S. Cl.
CPC .............. *C10G 1/045* (2013.01); *C10G 45/32* (2013.01); *C10G 45/44* (2013.01); *C10G 69/06* (2013.01); *C10G 2300/107* (2013.01); *C10G 2300/1011* (2013.01); *C10G 2300/42* (2013.01); *C10G 2300/44* (2013.01); *Y02P 30/20* (2015.11)

(56) References Cited

U.S. PATENT DOCUMENTS

| | | |
|---|---|---|
| 4,409,089 A | 10/1983 | Rudnick |
| 5,792,340 A | 8/1998 | Freel et al. |
| 5,961,786 A | 10/1999 | Freel et al. |
| 7,691,159 B2 | 4/2010 | Li |
| 7,905,990 B2 | 3/2011 | Freel |
| 7,960,520 B2 | 6/2011 | McCall et al. |
| 8,499,702 B2 | 8/2013 | Palmas et al. |
| 8,519,206 B2 | 8/2013 | Holtzapple et al. |
| 8,961,743 B2 | 2/2015 | Freel |
| 11,268,034 B2 * | 3/2022 | Chauhan .............. C10G 47/00 |
| 2007/0100162 A1 | 5/2007 | Petrus et al. |
| 2008/0047876 A1 | 2/2008 | Keller |
| 2008/0139418 A1 | 6/2008 | Cioletti et al. |
| 2009/0250381 A1 | 10/2009 | Fan et al. |
| 2010/0159522 A1 | 6/2010 | Cirakovic |
| 2011/0230688 A1 | 9/2011 | Charon et al. |
| 2011/0269982 A1 * | 11/2011 | Benecke ................. C11C 3/10 |
| | | 564/138 |
| 2012/0005949 A1 | 1/2012 | Stevens et al. |
| 2012/0091042 A1 | 4/2012 | Stiller et al. |
| 2012/0304529 A1 | 12/2012 | O'Connor et al. |
| 2013/0247449 A1 | 9/2013 | Castellvi Barnes et al. |
| 2013/0338411 A1 | 12/2013 | Sharma |
| 2016/0032196 A1 | 2/2016 | Abdullah et al. |
| 2016/0053189 A1 | 2/2016 | Wang et al. |
| 2016/0130202 A1 | 5/2016 | Barta et al. |

FOREIGN PATENT DOCUMENTS

| | | |
|---|---|---|
| WO | 2011117705 A2 | 9/2011 |
| WO | 2017049271 A1 | 3/2017 |
| WO | 2017052454 A1 | 3/2017 |

OTHER PUBLICATIONS

International Search Report from PCT Application No. PCT/US2018/042103, dated Dec. 17, 2018.
Written Opinion from PCT Application No. PCT/US2018/042106, dated Oct. 12, 2018.
International Search Report from PCT Application No. PCT/US2018/042106, dated Oct. 12, 2018.

* cited by examiner

TRANSFER HYDROGENATION OF HEAVY HYDROCARBONS WITH HYDROGEN-DONOR SOLVENTS

CROSS-REFERENCE TO RELATED APPLICATIONS

This application is a divisional of U.S. application Ser. No. 16/631,106 filed Jan. 14, 2020, now U.S. Pat. No. 11,306,256, which is a U.S. National Phase under 35 U.S.C. § 371 of International Application No. PCT/US2018/042106, filed Jul. 13, 2018, which claims the benefit of U.S. Provisional Application No. 62/642,709, which was filed Mar. 14, 2018, and U.S. Provisional Application No. 62/532,801, which was filed on Jul. 14, 2017, the contents of which are hereby incorporated by reference in their entirety.

STATEMENT OF GOVERNMENT RIGHTS

This invention was made with government support under Contract Number DE-FE0023963 awarded by the US Department of Energy. The government has certain rights in the invention.

This invention relates in general to processes and systems for converting high-viscosity hydrocarbon carbonaceous feedstocks to low viscosity hydrocarbons and, more particularly, to allow pipeline transport of bitumen from oil sands and petroleum residues. The invention also relates to methods of mild upgrading of bitumen and petroleum residues by transfer hydrogenation due to the action of hydrogen-donor (H-donor) solvent.

BACKGROUND

As energy consumption in the United States and throughout the world continues to increase, additional methods for environmentally clean energy conversion that can convert oil sand, petroleum residues, or other heavy hydrocarbon energy resources to fuels, hydrogen and chemicals are desired. Concerns about the increased wastes and costs of many of the conventional conversion processes, and the low efficiencies of such processes, have led to further research for cleaner, more efficient processes.

Oil sands or tar sands are a type of petroleum deposit. Oil sands are either loose sands or partially consolidated sandstone containing a naturally occurring mixture of sand, clay, and water, saturated with a dense and extremely viscous form of petroleum technically referred to as bitumen. Natural bitumen deposits are reported in many countries, but large amounts can be found in Canada. Crude bitumen in the Canadian oil sands is described as "a highly viscous mixture of hydrocarbons not usually recoverable at a commercial rate through a well because it is too thick to flow." Crude bitumen is defined as having a viscosity greater than 10,000 cP at room temperature. Crude bitumen viscosity can typically reach 100,000 to 200,000 cP.

Petroleum residues are the bottoms of the distillation columns used in petroleum production. The cut point for these residues is typically >600° C. which are heavy in asphaltenes and usually compared to bitumen. Some residual cuts are as low as 400° C. The residual temperature and properties depends on the refinery capabilities.

Processes for treating bitumen and petroleum residues are many. The primary practice to reduce the viscosity of bitumen is to use a diluent, called Dil-bit, such as condensates from natural gas recovery plants. The amount of diluent required is high, for example 25-50% by weight of the bitumen. After delivering the diluted bitumen to a refinery, this condensate (diluent) is distilled out as it is not compatible with typical refinery products. The recovered diluent is often returned to the site of oil sands mine, further increasing the expense of treatment. Another well-known method for reducing the viscosity of bitumen or petroleum residues is called visbreaking, which is essentially a thermal cracking process where some of the feedstock is converted to coke and gaseous products which are of low value. Visbreaking is typically carried out above about 450° C. Visbreaking results in the formation of significant amounts of coke which increases the costs for operating the equipment. These heavy hydrocarbons can also be catalytically upgraded using high pressure hydrogen or can be converted to a synthesis gas via steam gasification.

It would be desirable to provide a new process for the production of low viscosity and mildly refined liquid hydrocarbons using H-donor solvent.

SUMMARY AND DETAILED DESCRIPTION

Figure 1:
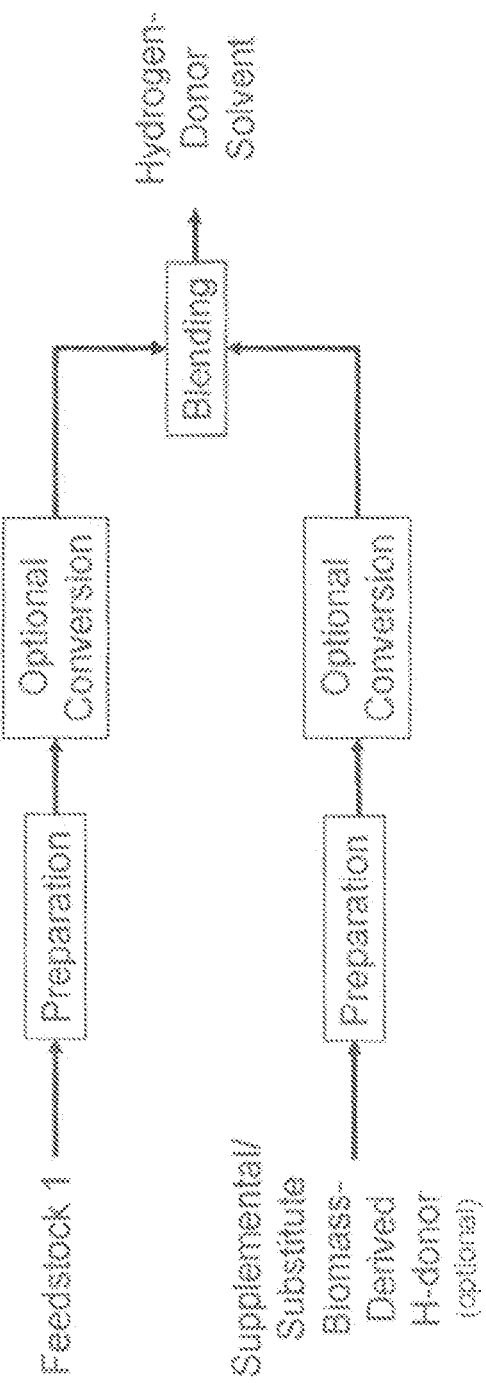
FIG. 1 is a flowchart of Subsystem 1 of the heavy hydrocarbon treatment process of the invention: the preparation of an H-donor solvent.

Processes for upgrading of bitumen and petroleum residues by transfer hydrogenation has been developed. These processes allow the production of low viscosity and mildly refined liquid hydrocarbons using hydrogen-donor solvent in which the feedstock is not wasted by unnecessary conversion to coke and gaseous byproducts. Because the hydrogen-donor solvent is compatible with refinery processes, it is not necessary to remove it prior to refining the hydrocarbon products. The hydrogen-donor solvents improve the upgradability of heavy hydrocarbons, and are economical and environmentally friendly.

One aspect of the invention is a process for treating highly viscous hydrocarbons. In one embodiment, the process comprises: preparing a hydrogen-donor solvent; heating a mixture of the hydrocarbon and the hydrogen-donor solvent; and cooling the product to produce a low viscosity and mildly upgraded hydrocarbon. The resulting, low viscosity product can be transported to a refinery.

During the reaction process, the H-donor solvent provides hydrogen to thermally-created fragments from the hydrocarbon via transfer hydrogenation, which eliminates or minimizes condensation reactions that lead to formation of coke.

The process allows the hydrocarbon to be treated without using molecular hydrogen and an added catalyst.

In some embodiments, the hydrogen-donor solvent comprises a mixture of hydrogen-donor solvents.

In certain embodiments, the hydrogen-donor (H-donor) solvent is derived from fossil sources, such as petroleum crude oil or coal. In certain embodiments, the H-donor solvent is partially or entirely derived from biomass.

In some embodiments, the hydrogen-donor solvent has a cyclic ring with one or more double bonds on the ring without being fully aromatized.

In some embodiments, the hydrogen-donor solvent contains compounds that can dehydrogenate during hydrocarbon treatment.

In some embodiments, the hydrogen-donor solvent is prepared by conjugating double bonds in multiply unsaturated fatty acids.

In some embodiments, the hydrogen-donor solvent comprises a dimer acid.

In some embodiments, the hydrogen-donor solvent comprises a material produced from pine tree processing.

In some embodiments, the hydrogen-donor solvent comprises an oil produced by catalytic hydrothermolysis.

In some embodiments, the hydrogen-donor solvent has been chemically converted to improve its solvent usefulness before heating the mixture.

In some embodiments, the hydrogen-donor solvent has been chemically converted by one or more of the following processes: esterification, hydrothermolysis, Diels-Alder reactions, dimerization, pyrolysis, hydrotreatment, or bodying.

In some embodiments, the hydrocarbon is bitumen from oil sands.

In some embodiments, the hydrocarbon is a petroleum residue.

Another aspect of the invention is a process for using a hydrogen donor solvent. In one embodiment, the process comprises: providing a hydrogen-donor feedstock; modifying the feedstock to improve its usefulness as a hydrogen donor; and conducting a transfer hydrogenation process using the modified feedstock as an H-donor solvent. In certain embodiments, the transfer hydrogenation process is a viscosity reduction process for the viscous hydrocarbons, which can then be transported by a pipeline.

In some embodiments, the modification of the feedstock for H-donor results in at least one of: improved stability, improved resistance to decomposition at elevated temperature, and improved solvent ability.

In some embodiments, the transfer hydrogenation process is a heavy hydrocarbon treatment process.

In some embodiments, the modification comprises esterification, hydrothermolysis, Diels-Alder reactions, dimerization, pyrolysis, hydrotreatment, or bodying.

A heavy hydrocarbon treatment process is provided for reducing the hydrocarbon viscosity and for affecting mild upgrading via transfer hydrogenation. The process may offer a significant reduction in operating costs compared with other processes.

The invention also relates to methods of reducing the viscosity of bitumen or petroleum residues.

Testing has shown that a number of biomass-derived, hydrogen-donor solvents according to the invention can reduce the viscosity of bitumen or petroleum residues by at least 98%. For example, a sample of bitumen was treated with 10% biomass-derived H-donor solvent for 30 minutes at 400° C. The viscosity was then reduced from 53,169 cP at 25° C. to 414 cP at 25° C. In another example, a bitumen from a different source was treated with 5% of the same biomass-derived H-donor solvent to reduce its viscosity from 10,660 cP to 228 cP, both measured at 25° C. This demonstrates that the amount of solvent required in the claimed process is only 10-20% of the amount of diluent (Dil-bit) currently used (25-50%). In another example, with a petroleum residue, the treatment with the same biomass-derived H-donor solvent reduced the 25° C. viscosity for 2,469,000 cP to 1,251 cP.

In certain embodiments, the heavy hydrocarbon treatment process includes two subsystems: (1) preparation of an H-donor solvent and (2) treatment of a highly viscous hydrocarbon with the H-donor solvent, without use of gaseous hydrogen and/or a hydrogenation catalyst. Examples of the subsystems are described below.

Subsystem 1. Preparation of H-Donor Solvent

FIG. 1 illustrates an embodiment of Subsystem 1 of the process: preparation of an H-donor solvent. In certain embodiments, the H-donor solvent may be a one- or multiple-component solvent mixture.

The solvent used to treat a heavy hydrocarbon includes an H-donor solvent. The H-donor solvent can dehydrogenate and give up hydrogen to newly formed heavy hydrocarbon fragments during the process of heating. This solvent may also solvate the hydrocarbon-derived fragments. FIG. 1 shows the preparation of an H-donor solvent from a suitable feedstock. A number of different H-donor solvents according to the invention are described in more detail herein below.

Optionally, the H-donor solvent can be chemically converted/modified to improve its usefulness as a hydrogen-donor solvent in the present process. For example, the conversion may result in at least one of: improved stability, improved resistance to decomposition at elevated temperature, improved solvent ability, and removal of non-useful matter in the biomass feedstock. The conversion is described in more detail herein below.

In some embodiments, the H-donor solvent is a mixture that optionally includes a second, biomass-derived H-donor solvent. FIG. 1 shows the preparation of the second solvent from a biomass feedstock. In certain embodiments, the second, biomass-derived solvent may enhance the action of the first H-donor solvent. In other embodiments, the second solvent may help to increase the hydrogen content of the hydrocarbon product, thus helping reduce the cost of upgrading the product to distillate fuels. A number of different, biomass-derived solvents according to the invention are described in more detail herein below. In some cases, the entire H-donor solvent is derived from biomass feedstocks, which helps reduce the carbon footprint of the treated heavy hydrocarbons.

As shown in FIG. 1, the biomass-derived H-donor solvent is blended with the first H-donor solvent to produce the enhanced H-donor solvent for use in Subsystem 2 of the process.

Advantageously, the H-donor solvent may be produced in a small, distributed plant (e.g., less than 200 TPD, for example about 100 TPD) near the sources of H-donor solvent so the energy and cost required for transport of the solvent feedstock is greatly reduced. Additionally, the H-donor solvent is easily pumpable compared to feedstocks used to prepare the same.

Subsystem 2. Treatment of Heavy Hydrocarbon with Biomass-Derived Solvent

Figure 2:
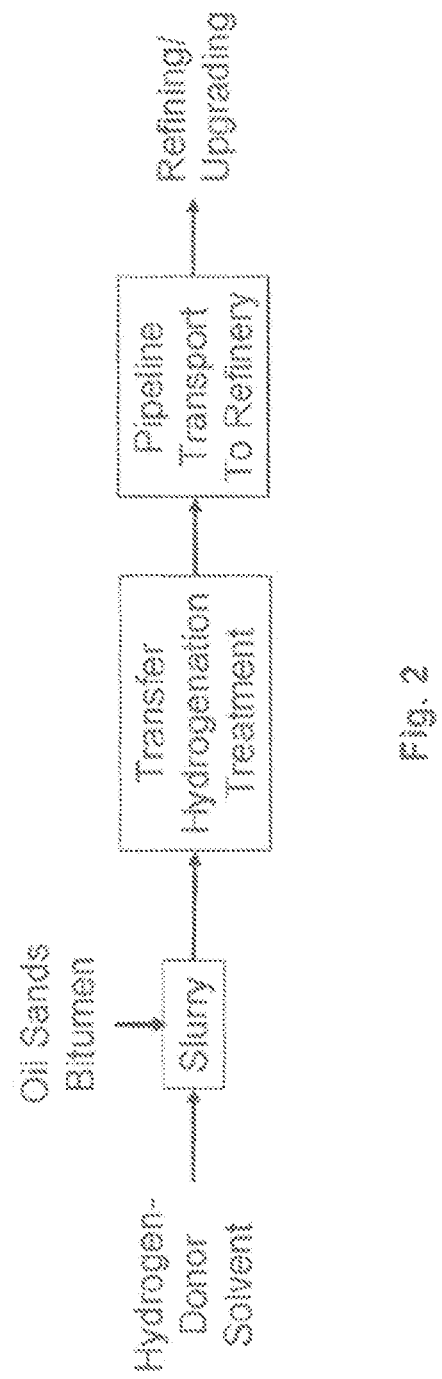
FIG. 2 is a flowchart of Subsystem 2 of the process: heavy hydrocarbon-solvent reaction and hydrogen transfer to produce a low-viscosity, increased hydrogen-content product.

FIG. 2 illustrates an example of Subsystem 2 of the process: heavy hydrocarbon treatment and hydrogen transfer in the H-donor solvent.

In the embodiment shown, the H-donor solvent from Subsystem 1 of the process is pumped to a slurry prep vessel.

The process can be used with any type of viscous hydrocarbon, including bitumen from oil sands and petroleum residues. An example of bitumen is the bitumen obtained from the Athabasca oil sands in Canada.

The heavy hydrocarbon and solvent are mixed together to form a slurry, and then preheated, if desired.

The slurry is fed to a reactor for thermal treatment and transfer hydrogenation. The slurry is heated in the reactor to thermally treat the hydrocarbon and to transfer hydrogen from the biomass-derived solvent(s) to hydrocarbon-derived fragments/molecules. The thermal treatment may be conducted using any suitable process conditions. For example, the temperature may be within a range from about 300° C. to about 500° C., or from about 350° C. to about 450° C. The pressure may typically be within a range of from about 400 psi to about 1200 psi, or from about 500 psi to about 900 psi, depending on the vapor pressure of the solvent(s). The slurry is held in the digester for a residence time suitable for transfer hydrogenation and viscosity reduction; for example, a time from about 2 minutes to about 120 minutes, or from about 5 minutes to about 45 minutes. In certain embodiments, two reactors in series are used in the process, and the reaction conditions are adjusted accordingly. The amount of H-donor solvent may vary from 1% to 50%, or preferably from 2% to 20%, by weight of heavy hydrocarbon.

As the heavy hydrocarbon is heated in the liquid solvent, the hydrocarbon begins to depolymerize where the hydrocarbon macromolecules are dissociated, due to thermally-induced chemical bond cleavage, into smaller, still fairly large molecular weight fragments. The fragments are deficient in hydrogen and will recombine (repolymerize) to make heavy tar or eventually coke if hydrogen is not quickly transferred to these fragments. The H-donor solvent rapidly provides the needed hydrogen and thereby prevents repolymerization of the hydrocarbon fragments, and eliminates low-value byproducts, such as coke or gas.

Referring again to FIG. 2, the product from the reactor is depressurized and cooled and then either stored for use or transported by a pipeline to a refinery.

Example Hydrogen-Donor Solvents

Select H-donor solvents are used to hydrogenate heavy hydrocarbons. The solvent used in the invention is capable of dehydrogenation and can be used in varying amounts in order to vary the properties of the treated hydrocarbon. In certain embodiments, the solvent is derived partially or solely from a biomass.

In certain embodiments, in order to dehydrogenate readily, the H-donor solvent has multi-cyclic compounds, such as phenols, cyclo-olefins, and hydroaromatics, with one or more double bonds on the ring without being fully aromatized. In certain embodiments, the H-donor solvent has significant amounts of multi-cyclic compounds (e.g. greater than 20%). The H-donor solvent may have a hydroaromatic cyclic structure that can be more fully aromatized on transfer of hydrogen during hydrocarbon treatment.

In certain embodiments, modifications of solvents are provided that significantly enhance their hydrogen donation properties and thereby improve their capabilities as solvents.

The H-donor solvents described herein below can be used in the heavy hydrocarbon treatment process of the invention, or they can be used in any other process involving hydro-refining of other carbonaceous feedstocks by transfer hydrogenation.

1) Coal-Derived H-Donor Solvents

Coal is known to contain certain molecules that are mild H-donors due to a low H/C atomic ratio. These molecules can be hydrogenated to be more effective H-donor solvents. A number of schemes to achieve this are possible, by first liquefying coal via pyrolysis or solvent-based liquefaction, fractionating a portion of the crude liquid product to isolate the target molecules, and then selectively hydrogenating it. For example, the coal tars produced in coke ovens can be refined to derive a coal tar distillate, which can then be selectively hydrogenated followed by fractionation of the product rich in H-donor solvents, such as hydrogenated cresoles, indanes, tetralin, etc.

2) Petroleum Derived H-Donor Solvents

Petroleum crude oil also contains varying amounts of H-donor precursors such as hydroaromatics. These chemicals are, for example, concentrated during petroleum refining into streams such as cycle oil. These petroleum fractions can be selectively hydrotreated to increase the H-donor capacity.

3) Lignin-Derived H-Donor Solvents

Lignin is polymer derived from three types of alcohols: coumaryl; coniferyl; and sinapyl. Some of these phenolic groups can serve as H-donors, but first the lignin needs to be depolymerized or liquefied, fractionated, and hydrogenated to increase the H-donor capacity.

4) Dimer Acids

Dimer acids are made by treating fatty acids with various clays at high temperature in order to react at the double bonds of two fatty acids. They can form a cyclic ring, such as a cyclohexene ring, at the center of addition by Diels-Alder chemistry. They sometimes make small amounts of trimer acid also. The cyclic ring can participate in the transfer hydrogenation of heavy hydrocarbons. The cyclic ring will also be prone to aromatization and thus facilitate transfer hydrogenation. It is desirable that the cyclic ring formed contains a double bond as the saturated form would be more stable and less prone to dehydrogenation. The dimer acids in aliphatic carboxylic acid form are stable and can be heated to high temperature without decarboxylation which would lead to high pressures. However, good results could also be expected from select esters or amides of the dimer acids.

5) Esters and Amides of Fatty Acids

Fatty acid esters and fatty acid amides could also serve as hydrogen donors.

6) Materials Produced from Pine Tree Processing

Another class of biomass-derived H-donor solvents is materials produced from pine tree processing. The main materials are turpentine, phytosterols, and rosin acids. The main chemical in turpentine is pinene, which has the potential for hydrogen transfer during heavy hydrocarbon treatment.

7) Solvent Produced by Rapid Hydrothermolysis of Oils

Another hydrogen-donor biomass-derived coal solvent is produced by rapid hydrothermolysis of a variety of oils, including vegetable oils, non-edible plant oils, energy crop-derived oils, and algae. For example, a catalytic hydrothermolysis (CH) process has been developed by Advanced Research Associates and is described in U.S. Pat. No. 7,691,159, which is incorporated by reference herein. The CH process converts some of the straight-chain, aliphatic molecules to cyclics/aromatics as well as polyolefins. The patent discloses use of the resulting oils as biofuels. The present process may modify the CH oils to alter the quantity and type of cyclics/aromatics in order to optimize the coal solvent properties.

8) Tetrahydrofuran (THF) Diols

Tetrahydrofuran diols, or its esters with biomass-derived organic acids, can also be used as hydrogen transfer agents. These diols can be obtained from a number of sources. For example, epoxidized methyl linoleic rearranges to THF diol in greater than 90% yield when contacted with alumina or aqueous acid at ambient temperature, while epoxidized methyl soyate (normal variety) rearranges to 74% THF diols when exposed to acids.

Conversion of Hydrogen-Donor Solvents

Optionally, the H-donor solvent can be chemically converted/modified to improve its usefulness as a hydrogen-donor solvent in the present coal-to-liquids process. For example, the conversion may result in at least one of: improved stability, improved resistance to decomposition at elevated temperature, and improved solvent ability.

More generally, one embodiment the present invention relates to a method for improving the H-donor properties of a solvent. The method comprises: providing an H-donor solvent; modifying the feedstock to improve its usefulness as a hydrogen-donor; and conducting a transfer hydrogenation process using the modified feedstock as a hydrogen-donor.

A number of different methods can be used for converting/modifying a biomass-derived hydrogen-donor. For example, the H-donor solvent may be a carboxylic acid. The carboxylic acid can be esterified or amidified in order to stabilize the molecule by decreasing the chance for decarboxylation or improving properties through the reactant. Other reactants such as glycerol, ethylene glycol, propylene glycol, and other alkyl alcohols amongst many others can be used to control properties.

Another way to get cyclic components into the fatty acid, ester, or amide is by the formation of tetrahydrofurans at the olefinic sites where two or more double bonds are in close proximity. This enhancement is due to the fact that THF groups readily lose two moles of hydrogen when sufficiently heated in converting to aromatic furan structures. One other way to get a THF group onto a fatty acid is to esterify with tetrahydrofurfuryl alcohol. For example, tetrahydrofurfuryl alcohol (typically made by reduction of furfural) when esterified to various carboxylic acids that themselves have hydrogen transfer abilities significantly enhances the overall hydrogen transfer properties of those esters.

THF diols, as described above, can be used for their hydrogen transfer capabilities. For example, rearrangement of epoxidized vegetable oil will generate THF diols that can be esterified with carboxylic acids to provide extra hydrogen transfer capabilities to carboxylic acids already bearing hydrogen transfer ability Some organic acids may undergo undesired decarboxylation during the coal-to-liquids process. These acids can be esterified or amidified in order to stabilize the molecule by decreasing the chance for decarboxylation.

In addition to the above-mentioned examples, other types of reactions can be used in the present process. The following is a partial list of potential conversion chemistries available for enhancing the solvent properties of various biomass-derived solvents: esterification, hydrothermolysis, Diels-Alder reactions, dimerization, pyrolysis, hydrotreatment, and bodying. A large number of alcohols/polyols can be used for making esters of biomass-derived acids, including ethanol, butanol, hexanol, glycerol, tetrahydrofurfuryl alcohol, and 2-methylpropane-diol.

Polyol Manufacture from Coal-Derived Syncrude

Figure 3:
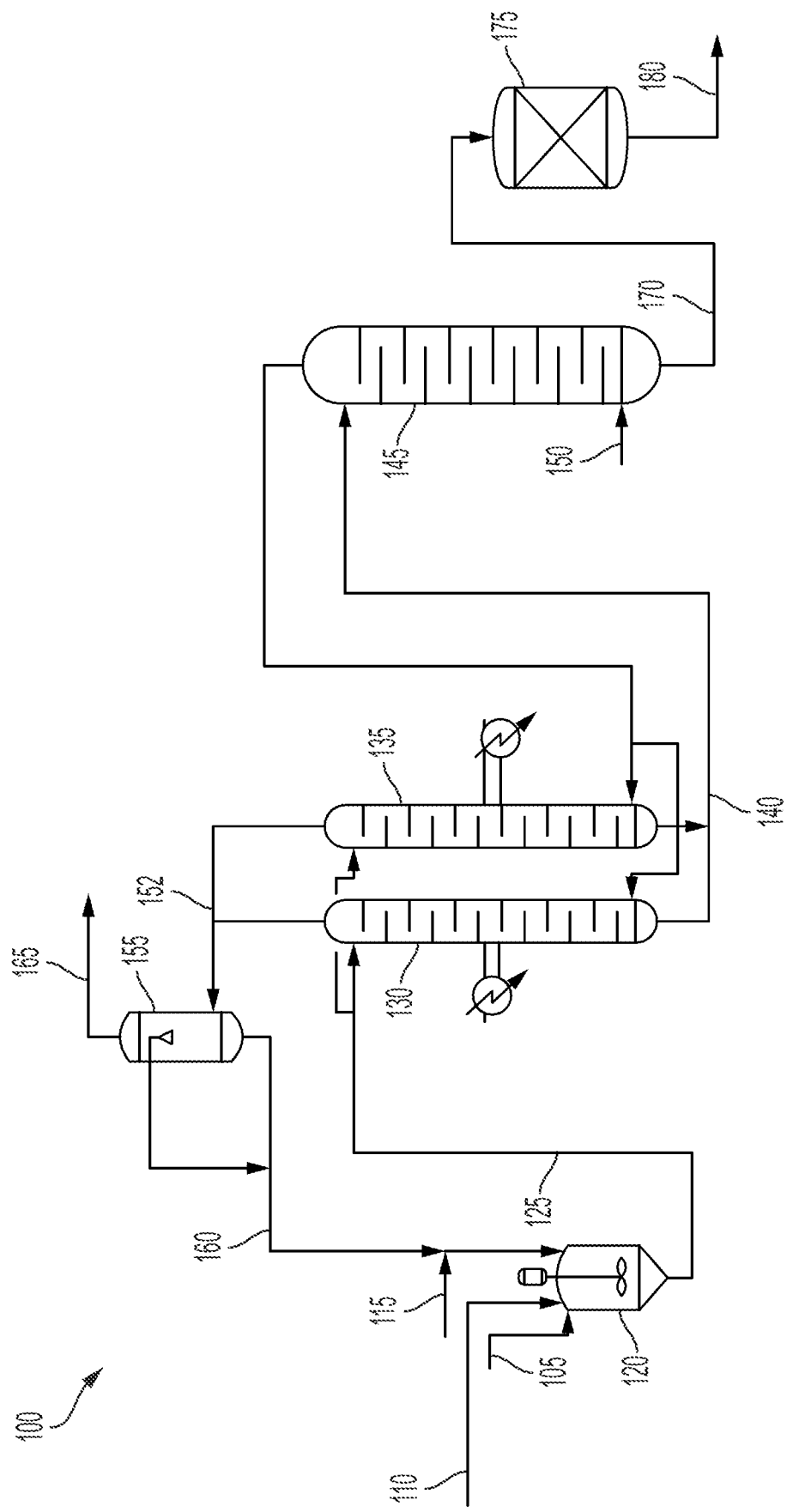
FIG. 3 illustrates one embodiment of a process for making a polyol from a heavy-oil mixture.
Figure 4:
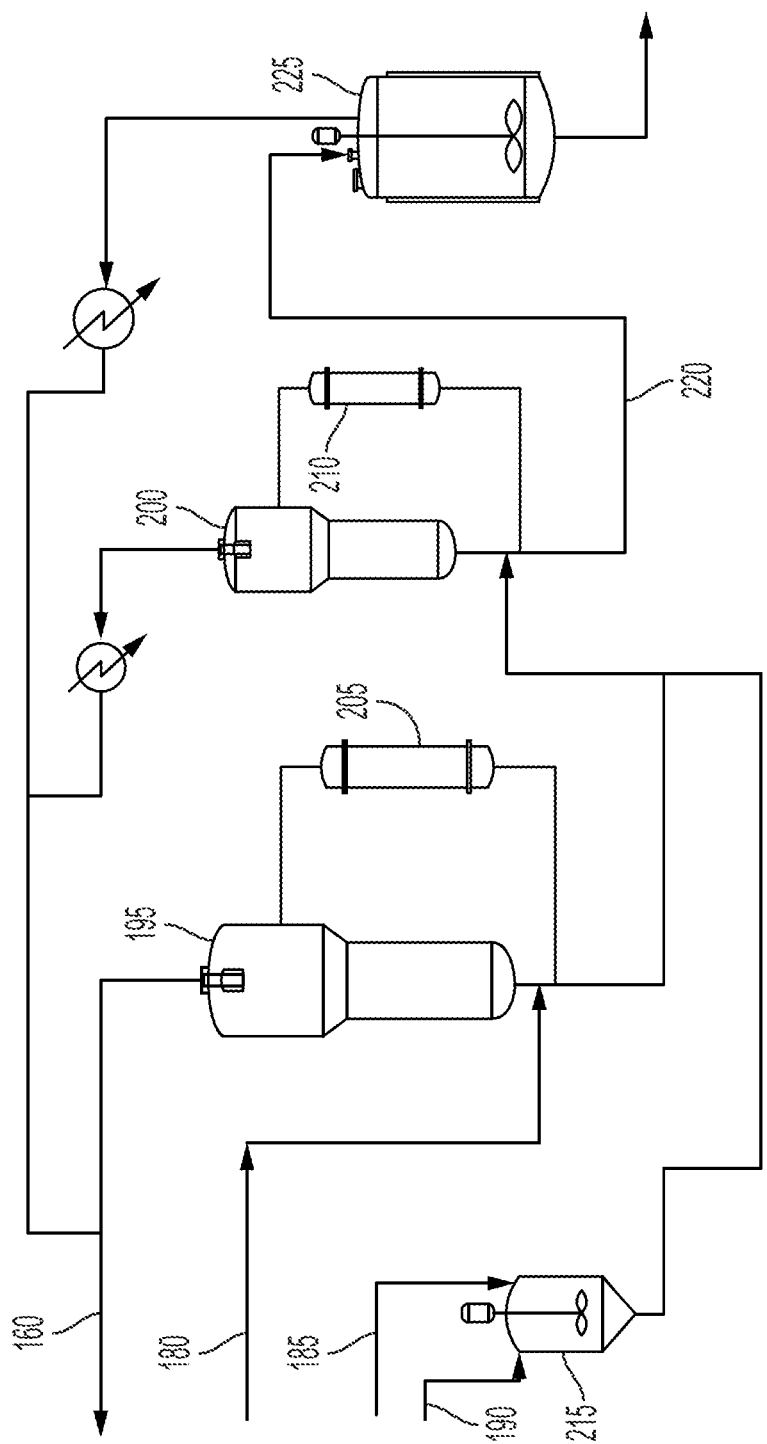
FIG. 4 illustrates another embodiment of a process for making a polyol from a heavy-oil mixture.

The process for conversion of the heavy-oil fraction from the syncrude to polyol is shown in FIGS. 3 and 4. In the heavy-oil to polyol process 100, the coal-derived heavy oil 105, sulfuric acid 110, and hexanol 115 are mixed together in a feed tank 120. The mixture is heated by the heavy oil 105 (maintained at 150° in storage to retain flow) to about 100° C. in the feed tank 120.

The mixture 125 is pumped to from feed tank 120 to ozonators 130, 135 in parallel. The liquid 140 is then pumped to a final ozonation vessel 145. These vessels 130/135 and 145 provide a two-stage ozonation process. The ozonation process is maintained at 2 atm and is maintained at 70° C. with cooling water.

The basis for the process design is 70 tonnes/day of heavy-oil feed 105. The feed 105 is assumed to be coming from the Coal to Liquids (CTL) facility at a hot temperature of 150° C. and sufficient pressure to flow into the mix tank 120. The heavy oil 105 will be mixed with hexanol 115 and 93% $H_2SO_4$ 110. The material balance is based on the following recipe:

The ozone requirement for the 70 tonne/day heavy-oil feed rate is 2938 lb/hr, or about 2100 cfm at 70° C. and 30 psig. Ozone is also the high cost reactant and needs to be converted efficiently. The reaction with ozone is exothermic and should be maintained at 70° C. The ozone is assumed to be provided 11.73% by weight ozone/remainder nitrogen, at 30 psig and 15.5° C. The ozone can be contacted with the heavy-oil mix by a few different methods. The basic method would be to inject the ozone in a series of stirred tanks. The heavy-oil mix would be cascaded through the mix tanks while the ozone is introduced at the bottom of each mix tank. This would assume that the ozone is absorbed into the mix in the liquid height of the tank. The heat would be removed by a cooling jacket or an external exchanger in a pump around loop.

Another method that could be investigated further is to use an educator to contact the ozone stream with the heavy-oil mix. This calls for a large heavy-oil flow (5000 gpm to 30,000 gpm) at high pressure (100 psig) to pull in the ozone required, and then a separation vessel to disengage the nitrogen and product oxygen from the heavy-oil mix.

The third method utilizes a countercurrent bubble tray column to contact the ozone with the heavy-oil mix. The ozone is assumed to be 25 psig flowing into the bottom of the 8 ft diameter high pressure column. This gas volume then be divided between two identical 6 ft diameter low pressure columns operating at 15 psig bottom pressure, where it would be contacted by the incoming heavy-oil mix. Each column is estimated to have 15 trays for contacting the ozone. Trays are spaced 18" apart and heavy-oil mix holdup is assumed to be sufficient for the reaction. The high-pressure column is assumed to have four pump arounds with cooling exchangers at tray 4, 7, 10, and 13. The low-pressure column is assumed to have pump arounds with cooling exchangers at tray 5 and 10. The heavy-oil mix from the low pressure columns would be combined and pass through another cooling exchanger before entering the high pressure column top tray. The cooling load is estimated to be about 15.9 MM btu/hr, based on previous ozone to polyol reaction energy balances. Cooling requirements may be mitigated by not heating the heavy-oil mix feed, although initial heating may be required to start the reaction. Vapor concentrations are at a reduced oxygen content and should be reviewed for flammability range. Solids build up in the column could present processing problems and should be evaluated.

Ozone 150 is provided from a toll ozonation process. The ozone is previously diluted with 50/50 with nitrogen. The oxygen and $N_2$ 152 are scrubbed after reaction to remove hexanol 160 in a spray tower 155. The gas mixture 165 is recycled to the ozone toll generator.

The reacted mix of ozonated heavy oil 170 is then neutralized by passing through a Dowex™ Marathon™ A resin bed 175. It is assumed that the resin will need to neutralize the full load of the H$_2$SO$_4$ in the solution. For an 8 hr bed online time, the resin bed volume required would be 460 ft3. Using an 8 ft diameter, 10 ft tall bed holds 502 ft$^3$ of resin. To allow for backwash, the bed straight side would be 16 ft. Allowing for three resin beds to cycle through the backwash, rinse, regeneration, and purge cycles, the total volume of resin required is 1506 ft$^3$. The oxidized heavy-oil mix in the resin bed would need to be pressed out with nitrogen. Hexanol would be used to backwash the resin bed and capture any esterified heavy oil remaining. This would then be drained to a hexanol recovery tank and recycled to the bio-solvent BS-41-hexanol mix tanks. Regeneration would be performed with 5% NaOH solution, and the wastewater would need to be treated.

The mixture 180 is then sent to a multi-effect evaporator to remove hexanol as shown in FIG. 4.

The esterified and neutralized heavy oil 180 will be sent to a pair of flash evaporators 195, 200 to remove the remaining hexanol. The first evaporator 195 duty is about 15.2 MM btu/hr while the second evaporator 200 duty is 5.5 MM btu/hr. The reboilers 205, 210 are based on 20% vaporization through the tubes. This will reduce the volume of the transesterification tank 225, which requires a 2-hour residence time for conversion. FIG. 4 shows the glycerin-dibutyltin oxide mixture from tank 215 being added to the output of the second evaporator 200.

Dibutyl tin oxide 190 and glycerin 185 are mixed in mix tank 215. Glycerine and dibutyltin oxide (DO) will be mixed in 4000 gal batch mix tanks 215. The mix tanks 215 will be sufficient for feeding the transesterification reactors 225 for 4 hrs per batch. This amounts to about a 55 gal drum of dibutyltin oxide per batch.

The dibutyl tin oxide and glycerin mixture and heavy oil are sent to tank 225 for transesterification.

The final product (heavy-oil-derived polyol) is then pumped to tanks where it is stored and then shipped to a foam manufacturer.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for making a polyol comprising:
    mixing a feed stream comprising a coal-derived heavy-oil fraction from syncrude with an alcohol and aqueous sulfuric acid to form a mixture;
    heating the mixture;
    reacting the coal-derived heavy-oil fraction in the heated mixture with ozone to form an ozonated heavy-oil fraction;
    reacting the ozonated heavy-oil fraction with glycerin to form the polyol; and
    optionally neutralizing the ozonated heavy-oil fraction before reacting the ozonated heavy-oil fraction with the glycerin.

2. The process of claim 1 wherein the alcohol comprises hexanol.

3. The process of claim 1 further comprising:
    removing heat while reacting the coal-derived heavy-oil fraction in the heated mixture with ozone.

4. The process of claim 1 wherein the ozone is injected into a tank containing the heated mixture.

5. The process of claim 1 wherein the ozone is contacted with the heated mixture in a countercurrent bubble tray column.

6. The process of claim 1 further comprising:
    diluting the ozone with nitrogen.

7. The process of claim 1 further comprising:
    removing the alcohol from the polyol.

8. The process of claim 7 wherein the alcohol is removed by flash evaporation.

9. The process of claim 1 wherein the mixture is heated by the coal-derived heavy-oil fraction.

10. A process for making a polyol comprising:
    mixing a feed stream comprising a coal-derived heavy-oil fraction from syncrude with an alcohol and aqueous sulfuric acid to form a mixture;
    heating the mixture;
    reacting the coal-derived heavy-oil fraction in the heated mixture with ozone to form an ozonated heavy-oil fraction;
    removing heat while reacting the coal-derived heavy-oil fraction in the heated mixture with ozone;
    neutralizing the ozonated heavy-oil fraction to form a neutralized ozonated heavy-oil fraction; and
    reacting the neutralized ozonated heavy-oil fraction with glycerin to form the polyol.

11. The process of claim 10 wherein the alcohol comprises hexanol.

12. The process of claim 10 wherein the ozone is injected into a tank containing the heated mixture.

13. The process of claim 10 wherein the ozone is contacted with the heated mixture in a countercurrent bubble tray column.

14. The process of claim 10 further comprising:
    diluting the ozone with nitrogen.

15. The process of claim 10 further comprising:
    removing the alcohol from the polyol.

16. The process of claim 15 wherein the alcohol is removed by flash evaporation.

17. The process of claim 10 wherein the mixture is heated by the coal-derived heavy-oil fraction.

* * * * *